United States Patent
Dai et al.

(10) Patent No.: US 10,254,510 B2
(45) Date of Patent: Apr. 9, 2019

(54) CAMERA LENS

(71) Applicant: ZHEJIANG SUNNY OPTICS CO., LTD., Ningbo (CN)

(72) Inventors: Fujian Dai, Ningbo (CN); Lin Huang, Ningbo (CN); Jianke Wenren, Ningbo (CN)

(73) Assignee: ZHEJIANG SUNNY OPTICS CO., LTD., Ningbo, Zhejiang (CN)

( * ) Notice: Subject to any disclaimer, the term of this patent is extended or adjusted under 35 U.S.C. 154(b) by 0 days.

(21) Appl. No.: 14/913,539

(22) PCT Filed: Jan. 7, 2015

(86) PCT No.: PCT/CN2015/070301
§ 371 (c)(1),
(2) Date: Feb. 22, 2016

(87) PCT Pub. No.: WO2016/109956
PCT Pub. Date: Jul. 14, 2016

(65) Prior Publication Data
US 2017/0357080 A1 Dec. 14, 2017

(51) Int. Cl.
*G02B 13/18* (2006.01)
*G02B 3/02* (2006.01)
(Continued)

(52) U.S. Cl.
CPC .......... *G02B 13/0045* (2013.01); *G02B 9/62* (2013.01); *G02B 13/18* (2013.01)

(58) Field of Classification Search
CPC .............................. G02B 13/0045; G02B 9/62
See application file for complete search history.

(56) References Cited

U.S. PATENT DOCUMENTS 8,786,961 B2 * 7/2014 Sano ................. G02B 9/62
348/340
2012/0188654 A1 7/2012 Huang
(Continued)

FOREIGN PATENT DOCUMENTS

CN 202330843 U 7/2012
CN 103676088 A 3/2014
(Continued)

OTHER PUBLICATIONS

Translation of the International Search Report corresponding to International Patent Application No. PCT/CN2015/070301, dated Oct. 9, 2015, 2 pages.
(Continued)

*Primary Examiner* — Alicia M Harrington
(74) *Attorney, Agent, or Firm* — Lathrop Gage LLP

(57) ABSTRACT

Provided is a camera lens, including a first lens, a second lens, a third lens, a fourth lens, a fifth lens and a sixth lens from an object side of the camera lens to an image side of the camera lens in turn. The first lens is of a positive focal power, an object side surface of the first lens is convex; the second lens is of a negative focal power; the third lens is of a negative focal power, an object side surface of the third lens is concave; the fourth lens is of a positive focal power; the fifth lens is of a positive focal power, an image side surface of the fifth lens is convex; the sixth lens is of a negative focal power, an image side surface of the sixth lens is concave; and the camera lens meets the following formula: $0 < f/f4 < 0.8$; $0 < T12/T23 < 0.14$.

20 Claims, 11 Drawing Sheets

(51) Int. Cl.
   *G02B 13/00*   (2006.01)
   *G02B 9/62*    (2006.01)

(56) References Cited

U.S. PATENT DOCUMENTS

| | | | |
|---|---|---|---|
| 2012/0314301 A1* | 12/2012 | Huang | G02B 9/62 |
| | | | 359/713 |
| 2013/0215520 A1 | 8/2013 | Lai et al. | |
| 2014/0211326 A1 | 7/2014 | Lai | |

FOREIGN PATENT DOCUMENTS

| | | |
|---|---|---|
| CN | 103676108 A | 3/2014 |
| CN | 103777319 A | 5/2014 |
| CN | 103852858 A | 6/2014 |
| CN | 204314534 U | 5/2015 |
| JP | 2014035397 A | 2/2014 |
| KR | 20100040357 A | 4/2010 |
| TW | 201250277 A | 12/2012 |

OTHER PUBLICATIONS

Chinese Patent Application No. 201510006826.3 First Office Action dated Jun. 22, 2016, 6 pages.
Chinese Patent Application No. 201510006826.3 English translation of First Office Action dated Jun. 22, 2016, 6 pages.
European Patent Application No. 15831200.9 extended Search and Opinion dated Jul. 18, 2018, 10 pages.

* cited by examiner

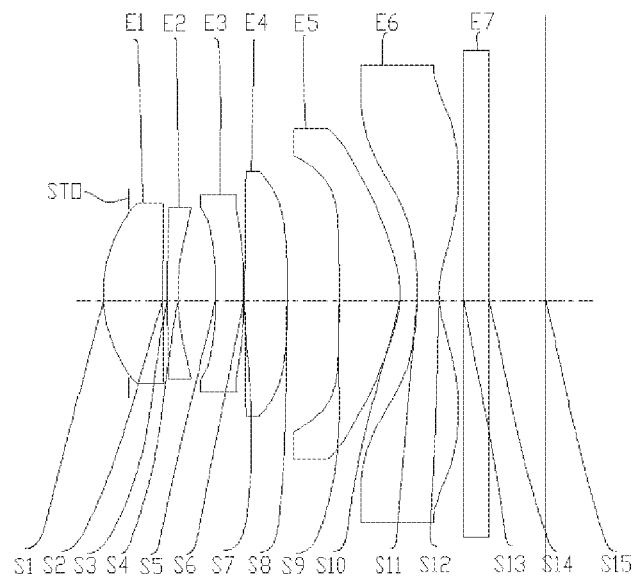
Fig. 11
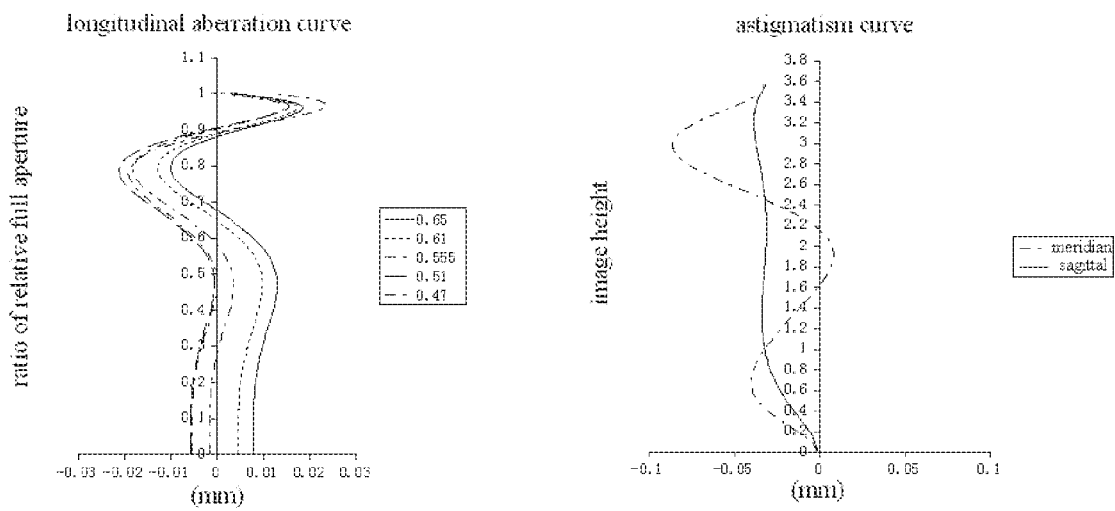
Fig. 12
Fig. 13

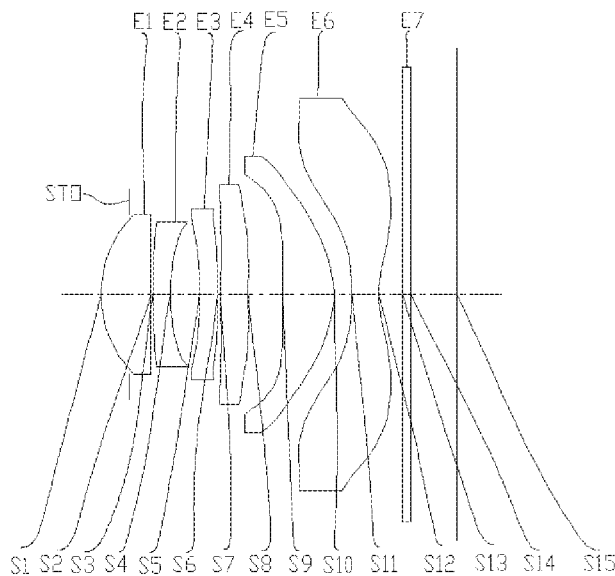
Fig. 26
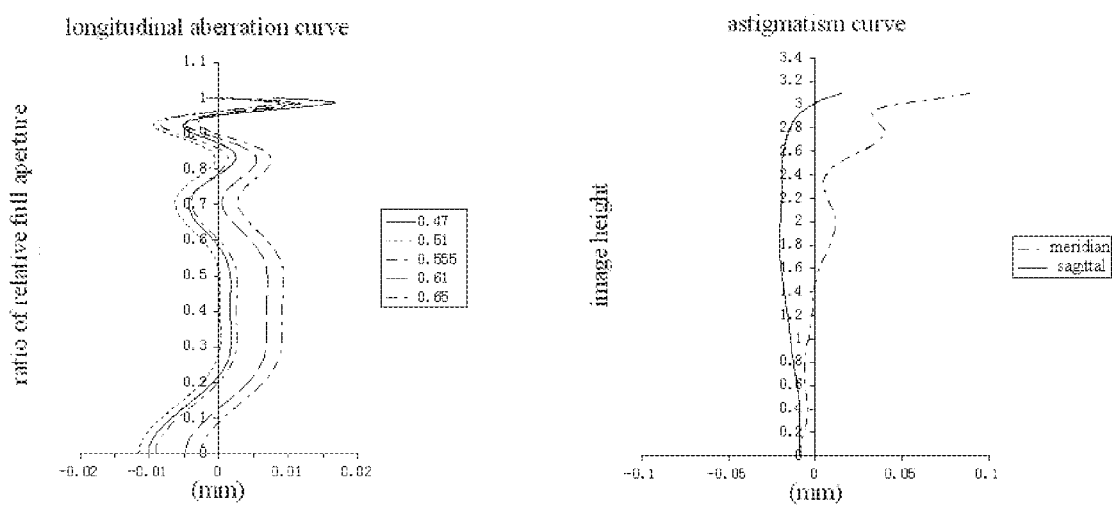
Fig. 27
Fig. 28

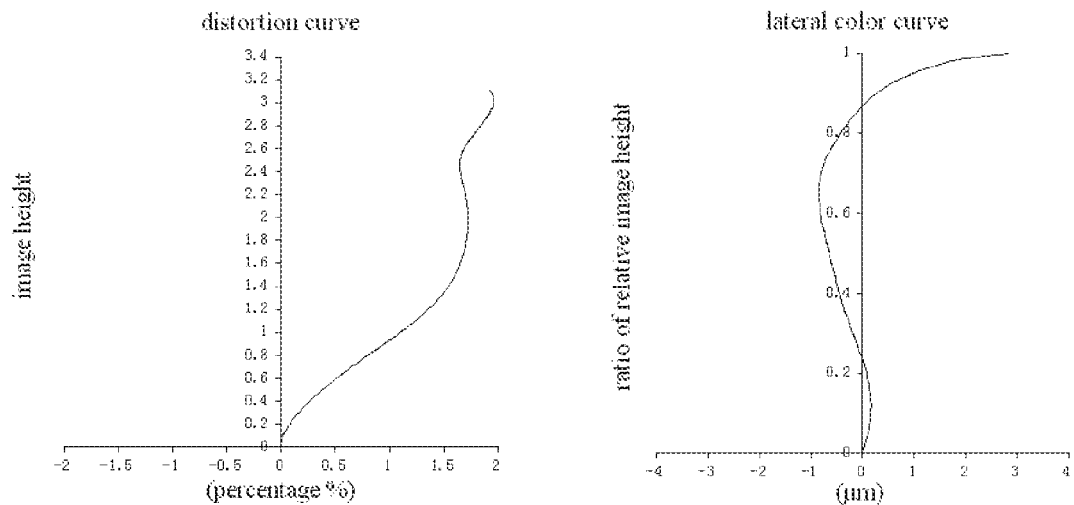
Fig. 29                                    Fig. 30
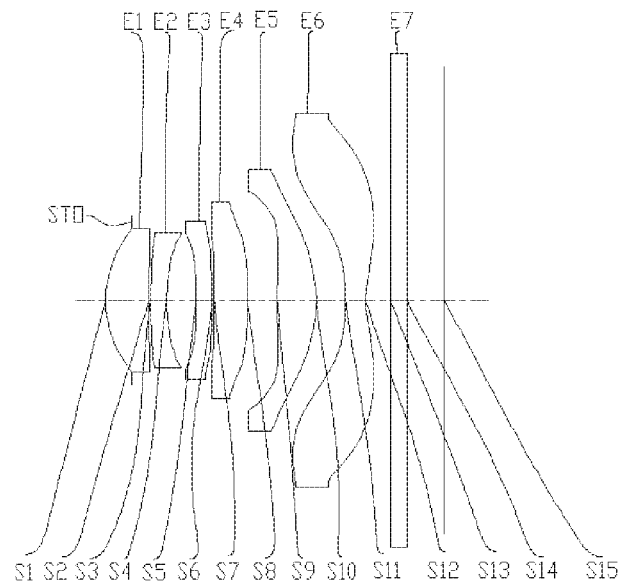
Fig. 31

CAMERA LENS

FIELD

The present disclosure relates to the field of an imaging technology, in particularly to a camera lens.

BACKGROUND

With the improvements in properties of charge-coupled device (CCD) and complementary metal-oxide semiconductor (CMOS) image sensors, as well as the reduction in size, it requires the corresponding camera lens to meet demands on high imaging quality and miniaturization.

Currently, a common thin camera lens with a high pixel generally encompasses five lenses, for example, an existing camera lens consists of a first lens being of a positive focal power, a second lens being of a negative focal power, a third lens being of a negative focal power, a fourth lens being of a positive focal power and a fifth lens being of a negative focal power from an object side of the camera lens to an image side of the camera lens in turn. Such a system in small aperture of a configuration with a small aperture improves the imaging quality effectively and maintains the miniaturization feature at the same time. However, with the development of portable electronic products, higher demands on features such as the pixel, the imaging quality and the resolution of the miniaturization camera lens are further proposed. In order to meet the demand on the high resolution, a configuration with a large aperture is adopted to meet the demand on the illuminance. However, the known five-lens structure in the configuration with the large aperture cannot further shorten system length to meet the demand on the imaging quality.

SUMMARY

Embodiments of the present disclosure seek to solve at least one of the problems existing in the related art.

An object of the present disclosure is to provide a camera lens, including a first lens, a second lens, a third lens, a fourth lens, a fifth lens and a sixth lens from an object side of the camera lens to an image side of the camera lens in turn, wherein the first lens is of a positive focal power, an object side surface of the first lens is convex;

the second lens is of a negative focal power;

the third lens is of a negative focal power, an object side surface of the third lens is concave;

the fourth lens is of a positive focal power;

the fifth lens is of a positive focal power, an image side surface of the fifth lens is convex;

the sixth lens is of a negative focal power, an image side of the sixth lens is concave; and the camera lens meets the following formula:

$0 < f/f4 < 0.8;$ $0 < T12/T23 < 0.14,$ wherein f represents an effective focal length of the camera lens, f4 represents a focal length of the fourth lens, T12 is a distance between the first lens and the second lens along an axial direction, and T23 is a distance between the second lens and the third lens along the axial direction.

In some embodiments, an object side surface of the second lens is convex, an image side surface of the second lens is concave; and an object side surface of the fourth lens is convex.

In some embodiments, an object side surface of the sixth lens is concave;

at least one inflection point is present in the object side surface of the sixth lens and the image side surface of the sixth lens; and the camera lens further includes an aperture stop arranged between a photographed object and the second lens.

In some embodiments, the camera lens meets the following formula:

$1 < f123/Dr1r6 < 5.5,$ wherein f123 represents a combined focal length of the first lens, the second lens and the third lens, and Dr1r6 represents a distance from the object side surface of the first lens to an image side surface of the third lens along the axial direction.

In some embodiments, the camera lens further meets the following formula:

$0.5 < f123/f < 2.$

In some embodiments, the camera lens further meets the following formula:

$0 < f5/f < 1;$ and $0 < (R11+R12)/(R11-R12) < 1,$ wherein f5 represents a focal length of the fifth lens, and R11 and R12 represent curvature radiuses of the object side surface and the image side surface of the sixth lens, respectively.

In some embodiments, the first lens, the second lens, the third lens, the fourth lens, the fifth lens and the sixth lens are all made of plastic, and have at least one aspheric shape surface.

In some embodiments, the image side surface of the third lens is convex.

In some embodiments, an image side surface of the first lens is convex, and an object side surface of the fifth lens is convex.

In some embodiments, an image side surface of the fourth lens is concave.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 11 is a schematic view showing the camera lens according to Example 3 of the present disclosure;

FIG. 12 is a diagram showing a longitudinal aberration curve (mm) of the camera lens in Example 3;

FIG. 13 is a diagram showing an astigmatism curve (mm) of the camera lens in Example 3;

FIG. 26 is a schematic view showing the camera lens according to Example 6 of the present disclosure;

FIG. 27 is a diagram showing a longitudinal aberration curve (mm) of the camera lens in Example 6;

FIG. 28 is a diagram showing an astigmatism curve (mm) of the camera lens in Example 6;

FIG. 29 is a diagram showing a distortion curve (%) of the camera lens in Example 6;

FIG. 30 is a diagram showing a lateral color curve (μm) of the camera lens in Example 6;

FIG. 31 is a schematic view showing the camera lens according to Example 7 of the present disclosure;

DETAILED DESCRIPTION

Figure 1:
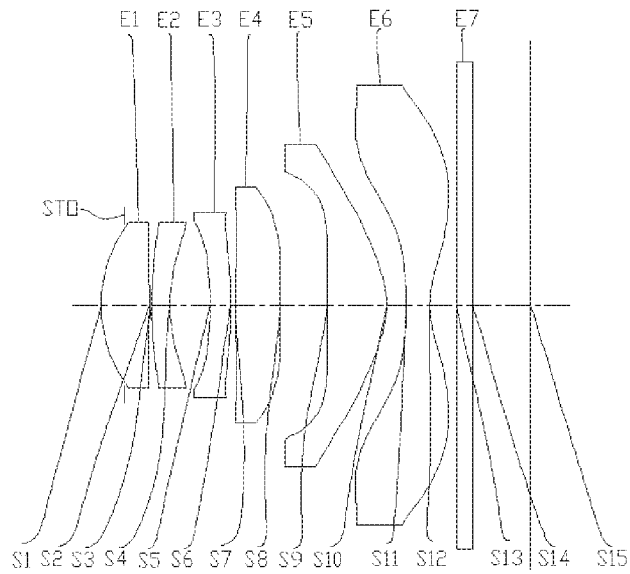
FIG. 1 is a schematic view showing the camera lens according to Example 1 of the present disclosure.

Embodiments of the present disclosure will be described in detail in the following descriptions, examples of which are shown in the accompanying drawings, in which the same or similar reference numerals represent the same or similar elements or elements having the same or similar functions throughout the descriptions. The embodiments described hereinafter with reference to the accompanying drawings are explanatory and illustrative, which are used to generally understand the present disclosure, but shall not be construed to limit the present invention.

In the description of the present disclosure, it shall be appreciated that, terms "first", "second" are just used herein for purposes of description and are not intended to indicate or imply relative importance or significance or to imply the number of indicated technical features. Thus, the feature defined with "first" and "second" may explicitly or implicitly include one or more this feature. In the description of the present disclosure, unless specified otherwise, "a plurality of" means two or more than two.

In the description of the present disclosure, it should be noted that, unless otherwise clearly defined and limited, the terms "mounted," "connected", "connection" should be broadly understood, and may be, for example, fixed connections, detachable connections, or integral connections; may also be electrical connections or may communicate with each other; may also be direct connections or indirect connections via intermediation; may also be inner communications or interaction relationship of two elements, which can be understood by those ordinary skilled in the art according to specific situations.

Various embodiments and examples are provided in the following descriptions to implement different structures of the present disclosure. In order to simplify the present disclosure, certain elements and settings will be described. However, these elements and settings are only by way of example and are not intended to limit the present disclosure. In addition, reference numerals and/or reference letters may be repeated in different examples in the present disclosure, this repeating is for the purpose of simplification and clarity and does not refer to relations between different embodiments and/or settings. Furthermore, examples of specific processes and materials are provided in the present disclosure, however, it would be appreciated by those ordinary skilled in the art that other processes and/or materials may be also applied.

With reference to FIG. 1, in an embodiment of the present disclosure, a camera lens includes a first lens, a second lens, a third lens, a fourth lens, a fifth lens and a sixth lens from an object side of the camera lens to an image side of the camera lens in turn, in which the first lens is of a positive focal power, an object side surface of the first lens is convex;

the second lens is of a negative focal power;

the third lens is of a negative focal power, an object side surface of the third lens is concave;

the fourth lens is of a positive focal power;

the fifth lens is of a positive focal power, an image side surface of the fifth lens is convex;

the sixth lens is of a negative focal power, an image side surface of the sixth lens is concave; and the camera lens meets the following formula:

$$0<f/f4<0.8;$$

$$0<T12/T23<0.14,$$

in which f represents an effective focal length of the camera lens, f4 represents a focal length of the fourth lens, T12 is a distance between the first lens and the second lens along an axial direction, and T23 is a distance between the second lens and the third lens along the axial direction.

The two formulas above are satisfied to facilitate the miniaturization of the lens and improve the imaging quality.

Specifically, the first lens E1 includes an object side surface S1 and an image side surface S2. The second lens E2 includes an object side surface S3 and an image side surface S4. The third lens E3 includes an object side surface S5 and an image side surface S6. The forth lens E4 includes an object side surface S7 and an image side surface S8. The fifth lens E5 includes an object side surface S9 and an image side surface S10. The sixth lens E6 includes an object side surface S11 and an image side surface S12.

In some embodiments, the object side surface S3 of the second lens E2 is convex, the image side surface S4 of the second lens E2 is concave, and the object side surface S7 of the fourth lens E4 is convex.

In some embodiments, the object side surface S11 of the sixth lens E6 is concave, at least one inflection point is present in the object side surface S11 of the sixth lens E6 and the image side surface S12 of the sixth lens E6. The camera lens further includes an aperture stop STO arranged between a photographed object and the second lens E2.

The focal power and the shape are controlled to further shorten the total length of the camera lens, which is beneficial to features of a high pixel and a big aperture.

In some embodiments, the camera lens meets the following formula:

$$1<f123/Dr1r6<5.5;$$

in which f123 represents a combined focal length of the first lens E1, the second lens E2 and the third lens E3, and Dr1r6 represents a distance from the object side surface S1 of the first lens E1 to the image side surface S6 of the third lens E3.

The above formula is satisfied to eliminate astigmatism of the lens system, and further to shorten a total length of the camera lens.

In some embodiments, the camera lens further meets the following formula:

$$0.5<f123/f<2.$$

By setting like this, it is beneficial to control an aberration of the camera lens, in particularly to an aberration if a field angle is increased.

In some embodiments, the camera lens further meets the following formula:

$$0<f5/f<1; \text{ and}$$

$$0<(R11+R12)/(R11-R12)<1,$$

in which f5 represents a focal length of the fifth lens E5, and R11 and R12 represent curvature radiuses of the object side surface S11 and the image side surface S12 of the sixth lens E6, respectively.

It is beneficial to a feature of a high pixel of the camera lens by setting like this, and at the same time an effect on the camera lens caused by a distortion is reduced effectively, thus obtaining a better imaging quality.

In some embodiments, the first lens E1, the second lens E2, the third lens E3, the fourth lens E4, the fifth lens E5 and the sixth lens E6 are all made of plastic. At least one aspheric shape surface is present among surfaces of the first lens E1, the second lens E2, the third lens E3, the fourth lens E4, the fifth lens E5 and the sixth lens E6.

It is beneficial to features of the miniaturization, the high pixel and the big aperture by setting like this.

In some embodiments, the image side surface S6 of the third lens E3 is convex. It is beneficial to features of the miniaturization, the high pixel and the big aperture by setting like this.

In some embodiments, the image side surface S2 of the first lens E1 is convex, and the object side surface S9 of the fifth lens E5 is convex. It is beneficial to features of the miniaturization, the high pixel and the big aperture by setting like this.

In some embodiments, the image side surface S8 of the fourth lens E4 is concave. It is beneficial to features of the miniaturization, the high pixel and the big aperture by setting like this.

During imaging, light is imaged at the imaging side surface S15 after entering the camera lens and passing through a light filter E7 having an object side surface S13 and an image side surface S14.

A surface shape of the aspheric shape is defined by a formula as follows:

$$x = \frac{ch^2}{1 + \sqrt{1 - (k+1)c^2h^2}} + \sum Aih^i.$$

in which h is a height from any point on the aspheric shape to an optical axis, c is an apex curvature, k is a conic coefficient, Ai is a coefficient for the i-th order of the aspheric.

Example 1

In example 1, the camera lens meets the conditions of the following tables:

TABLE 1

| No. of surface | Curvature radius | Thickness | Material | Effective aperture | Conic coefficient |
|---|---|---|---|---|---|
| OBJ | infinity | infinity | | | |
| STO | infinity | −0.3324 | | 1.0900 | |
| S1 | 1.9605 | 0.6227 | 1.54, 56.1 | 1.1117 | −0.2821 |
| S2 | −17.3662 | 0.0325 | | 1.1000 | −92.2311 |
| S3 | 4.6469 | 0.2350 | 1.64, 23.8 | 1.1156 | −2.0714 |
| S4 | 2.0358 | 0.5160 | | 1.1137 | −5.5843 |
| S5 | −6.2175 | 0.2647 | 1.64, 23.8 | 1.1271 | 12.2934 |
| S6 | −11.5407 | 0.0621 | | 1.2510 | −80.9957 |
| S7 | 8.0645 | 0.5831 | 1.54, 56.1 | 1.5800 | 2.1584 |
| S8 | 58.6245 | 0.6048 | | 1.5835 | 7.9412 |
| S9 | 1345.1085 | 0.7687 | 1.54, 56.1 | 1.8007 | −99.9900 |
| S10 | −1.1583 | 0.2541 | | 2.1658 | −5.4343 |
| S11 | −5.7142 | 0.300 | 1.54, 56.1 | 2.6954 | −51.5719 |
| S12 | 1.1568 | 0.3462 | | 2.9500 | −7.2720 |
| S13 | infinity | 0.2100 | 1.52, 64.2 | 3.2233 | |
| S14 | infinity | 0.7500 | | 3.2734 | |
| IMA(S15) | infinity | | | 3.5595 | |

TABLE 2

| No. of surface | A4 | A6 | A8 | A10 | A12 | A14 | A16 |
|---|---|---|---|---|---|---|---|
| S1 | 1.0818E−02 | −6.4976E−03 | 1.0549E−02 | −4.8659E−03 | 0 | 0 | 0 |
| S2 | 2.3066E−02 | 6.9878E−03 | −1.1986E−02 | 2.0364E−03 | 0 | 0 | 0 |
| S3 | −8.0959E−02 | 9.9773E−02 | −6.8419E−02 | 2.0223E−02 | 0 | 0 | 0 |
| S4 | −4.0989E−02 | 5.7701E−02 | −4.1635E−02 | 7.6085E−03 | 0 | 0 | 0 |
| S5 | −1.5831E−02 | −3.0260E−02 | −1.1197E−02 | 9.4919E−03 | 0 | 0 | 0 |
| S6 | −3.2463E−02 | 7.1336E−03 | −6.3854E−03 | 1.0364E−02 | 0 | 0 | 0 |
| S7 | −7.2602E−02 | 2.5670E−02 | 4.1286E−04 | −1.2501E−03 | 0 | 0 | 0 |
| S8 | −5.2592E−02 | −8.1793E−03 | 5.3137E−03 | −9.3209E−04 | 0 | 0 | 0 |
| S9 | 9.4684E−04 | 4.1134E−03 | −2.0592E−02 | 1.0021E−02 | −2.4956E−03 | 2.3502E−04 | 0.0000E+00 |
| S10 | −3.2658E−03 | 1.1061E−02 | −1.4715E−02 | 5.9491E−03 | −9.6925E−04 | 5.4921E−05 | 0.0000E+00 |
| S11 | −6.5651E−02 | −1.8628E−02 | 2.1672E−02 | −6.3017E−03 | 8.9681E−04 | −6.4883E−05 | 1.9145E−06 |
| S12 | −7.0073E−02 | 2.1851E−02 | −4.8135E−03 | 7.1420E−04 | −7.6171E−05 | 5.3094E−06 | −1.6656E−07 |

Furthermore, f1=3.26 mm, f2=−5.86 mm, f3=−21.47 mm, f4=17.06 mm, f5=2.12 mm, f6=−1.74 mm, f=4.5 mm, TTL=5.55 mm and Semi-FOV=38.3°, Fno=2.03.

Figures 2, 3:
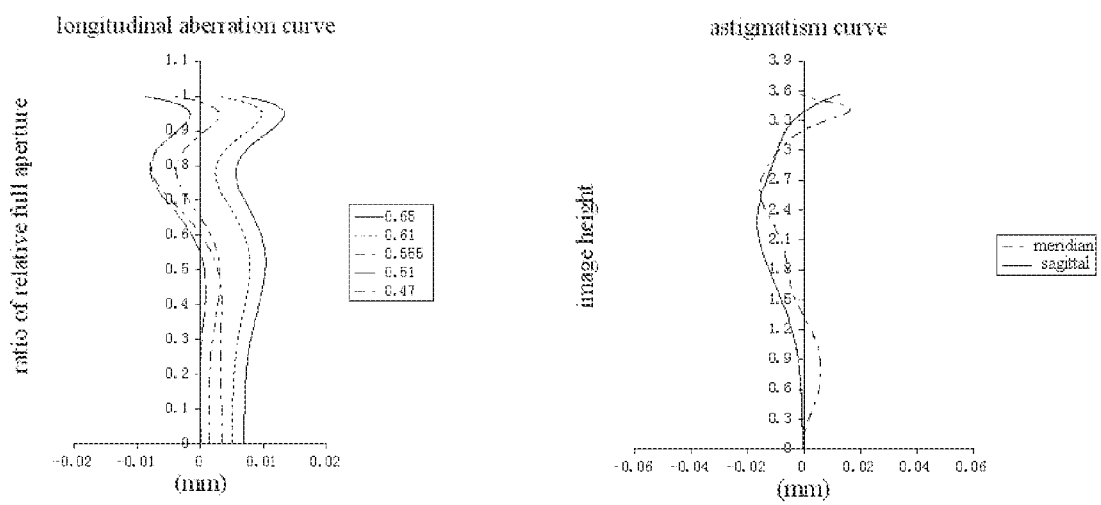
FIG. 2 is a diagram showing a longitudinal aberration curve (mm) of the camera lens in Example 1.
FIG. 3 is a diagram showing an astigmatism curve (mm) of the camera lens in Example 1.
Figures 4, 5:
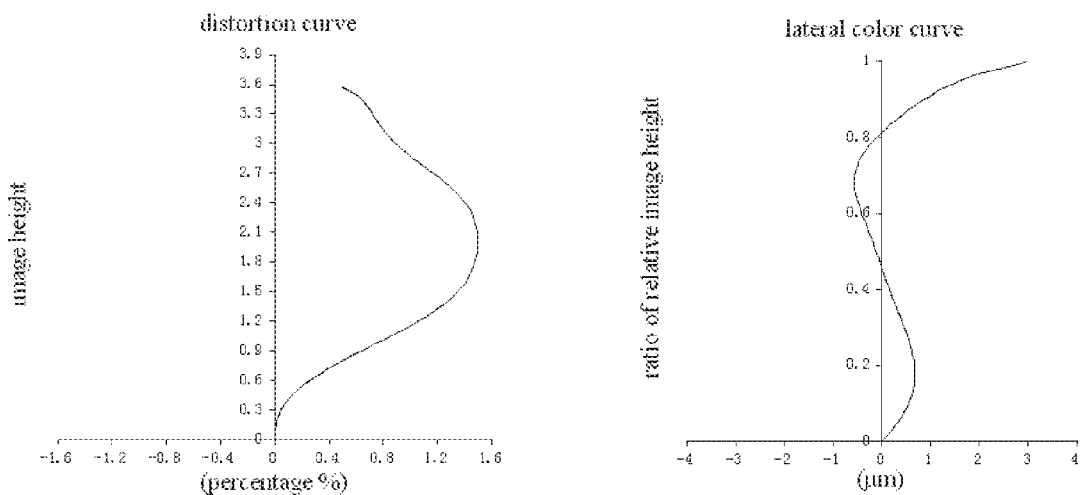
FIG. 4 is a diagram showing a distortion curve (%) of the camera lens in Example 1.
FIG. 5 is a diagram showing a lateral color curve (μm) of the camera lens in Example 1.
Figure 6:
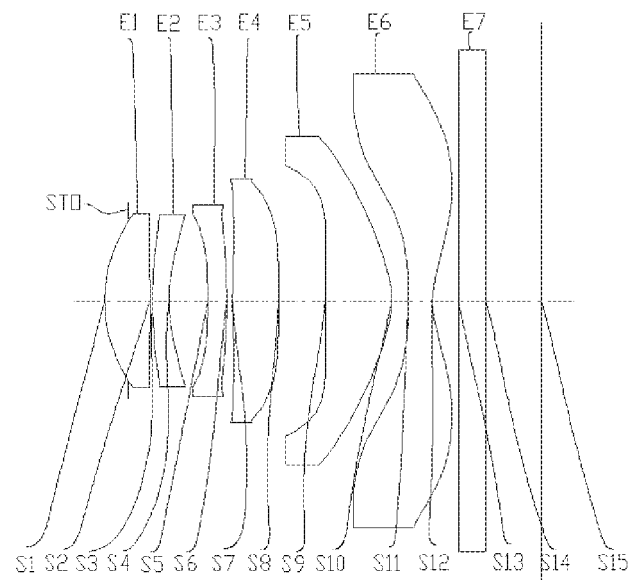
FIG. 6 is a schematic view showing the camera lens according to Example 2 of the present disclosure.

FIG. 2 is a diagram showing a longitudinal aberration curve (mm) of the camera lens in Example 1, FIG. 3 is a diagram showing an astigmatism curve (mm) of the camera lens in Example 1, FIG. 4 is a diagram showing a distortion curve (%) of the camera lens in Example 1, and FIG. 5 is a diagram showing a lateral color curve (μm) of the camera lens in Example 1. It can be seen that the aberration of the camera lens may be controlled effectively.

Embodiment 2

In example 2, the camera lens meets the conditions of the following tables:

TABLE 3

| No. of surface | Curvature radius | Thickness | Material | Effective aperture | Conic coefficient |
|---|---|---|---|---|---|
| OBJ | infinity | infinity | | | |
| STO | infinity | −0.3010 | | 1.0900 | |
| S1 | 1.9670 | 0.5850 | 1.54, 56.1 | 1.1335 | −0.2789 |
| S2 | −18.8334 | 0.0337 | | 1.1000 | −94.5154 |
| S3 | 4.5844 | 0.2124 | 1.64, 23.8 | 1.1157 | −2.2593 |
| S4 | 2.0349 | 0.5073 | | 1.1180 | −5.4645 |
| S5 | −6.2090 | 0.2430 | 1.64, 23.8 | 1.1293 | 10.2488 |
| S6 | −13.4461 | 0.0738 | | 1.2422 | −65.5918 |
| S7 | 7.4945 | 0.5998 | 1.54, 56.1 | 1.5800 | −2.7910 |
| S8 | −200.7876 | 0.6072 | | 1.5494 | −625.0000 |
| S9 | 55.7412 | 0.8605 | 1.54, 56.1 | 1.7645 | −426.3000 |
| S10 | −1.1967 | 0.2221 | | 2.1349 | −6.2078 |
| S11 | −6.6437 | 0.3082 | 1.54, 56.1 | 2.4777 | −43.7739 |
| S12 | 1.1294 | 0.3391 | | 2.9500 | −7.1752 |
| S13 | infinity | 0.3600 | 1.52, 64.2 | 3.1598 | |
| S14 | infinity | 0.7256 | | 3.2683 | |
| IMA(S15) | infinity | | | 3.6209 | |

TABLE 4

| No. of surface | A4 | A6 | A8 | A10 | A12 | A14 | A16 |
|---|---|---|---|---|---|---|---|
| S1 | 1.1013E−02 | −6.9499E−03 | 1.0546E−02 | −4.3922E−03 | 0 | 0 | 0 |
| S2 | 2.2858E−02 | 6.2778E−03 | −1.1564E−02 | 2.5556E−03 | 0 | 0 | 0 |
| S3 | −8.1212E−02 | 9.9090E−02 | −6.9391E−02 | 2.0400E−02 | 0 | 0 | 0 |
| S4 | −4.0799E−02 | 5.7176E−02 | −4.2512E−02 | 6.0635E−03 | 0 | 0 | 0 |
| S5 | −1.4145E−02 | −2.8131E−02 | −1.2134E−02 | 8.8633E−03 | 0 | 0 | 0 |
| S6 | −3.3677E−02 | 6.8354E−03 | −5.5906E−03 | 1.1006E−02 | 0 | 0 | 0 |
| S7 | −7.4031E−02 | 2.5423E−02 | 2.4193E−04 | −1.2895E−03 | 0 | 0 | 0 |
| S8 | −5.2259E−02 | −8.8900E−03 | 5.0667E−03 | −1.0381E−03 | 0 | 0 | 0 |
| S9 | −8.0583E−04 | 3.1666E−03 | −2.0651E−02 | 9.9927E−03 | −2.5042E−03 | 2.3614E−04 | 0.0000E+00 |
| S10 | −4.1627E−03 | 1.0727E−02 | −1.4752E−02 | 5.9437E−03 | −9.7041E−04 | 5.4646E−05 | 0.0000E+00 |
| S11 | −6.6149E−02 | −1.8680E−02 | 2.1665E−02 | −6.3027E−03 | 8.9669E−04 | −6.4895E−05 | 1.9147E−06 |
| S12 | −6.9323E−02 | 2.1923E−02 | −4.8077E−03 | 7.1439E−04 | −7.6194E−05 | 5.3041E−06 | −1.6731E−07 |

Furthermore, f1=3.29 mm, f2=−5.9 mm, f3=−18.3 mm, f4=13.25 mm, f5=2.16 mm, f6=−1.74 mm, f=4.58 mm, TTL=5.68 mm and Semi-FOV=37.8°, Fno=2.03.

Figure 7:
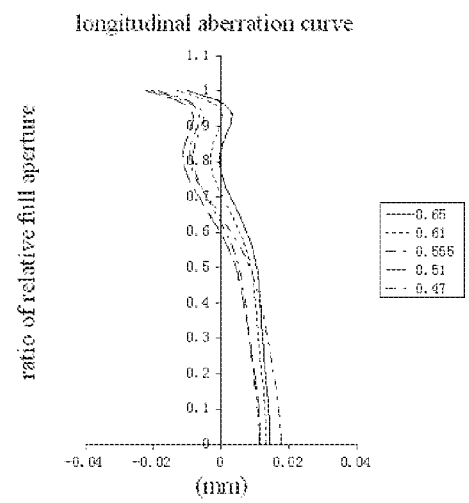
FIG. 7 is a diagram showing a longitudinal aberration curve (mm) of the camera lens in Example 2.
Figure 8:
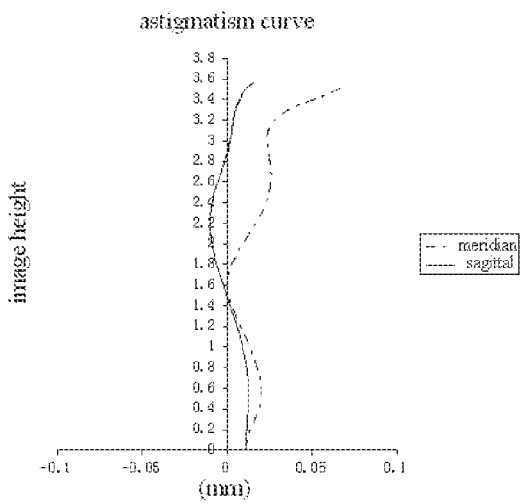
FIG. 8 is a diagram showing an astigmatism curve (mm) of the camera lens in Example 2.
Figure 9:
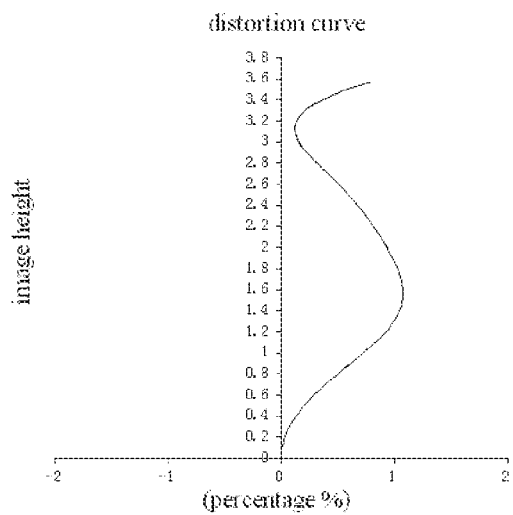
FIG. 9 is a diagram showing a distortion curve (%) of the camera lens in Example 2.
Figure 10:
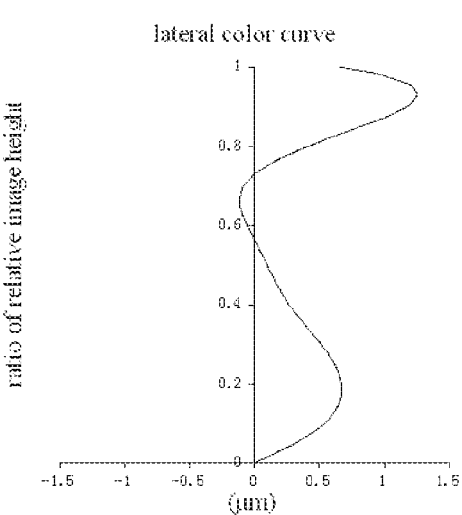
FIG. 10 is a diagram showing a lateral color curve (μm) of the camera lens in Example 2.

FIG. 7 is a diagram showing a longitudinal aberration curve (mm) of the camera lens in Example 2, FIG. 8 is a diagram showing an astigmatism curve (mm) of the camera lens in Example 2, FIG. 9 is a diagram showing a distortion curve (%) of the camera lens in Example 2, and FIG. 10 is a diagram showing a lateral color curve (μm) of the camera lens in Example 2. It can be seen that the aberration of the camera lens may be controlled effectively.

Embodiment 3

In example 3, the camera lens meets the conditions of the following tables:

TABLE 5

| No. of surface | Curvature radius | Thickness | Material | Effective aperture | Conic coefficient |
|---|---|---|---|---|---|
| OBJ | infinity | infinity | | | |
| STO | infinity | −0.3330 | | 1.0900 | |
| S1 | 1.8310 | 0.7667 | 1.54, 56.1 | 1.1690 | −0.2285 |
| S2 | 271.5113 | 0.0573 | | 1.1000 | 99.9999 |
| S3 | 10.0321 | 0.1381 | 1.64, 23.8 | 1.1010 | 9.0407 |
| S4 | 2.7433 | 0.4844 | | 1.0981 | −6.5754 |
| S5 | −7.1772 | 0.3621 | 1.64, 23.8 | 1.1165 | 15.0286 |
| S6 | −8.0994 | 0.0113 | | 1.2769 | −35.6031 |
| S7 | 8.8821 | 0.5467 | 1.54, 56.1 | 1.5800 | 4.1680 |
| S8 | 324.7984 | 0.6737 | | 1.5729 | −800.0000 |
| S9 | −37.5274 | 0.7867 | 1.54, 56.1 | 1.7770 | 232.2126 |
| S10 | −1.2006 | 0.2133 | | 2.1323 | −6.1721 |
| S11 | −5.5464 | 0.2823 | 1.54, 56.1 | 2.4074 | −28.2176 |
| S12 | 1.1203 | 0.3218 | | 2.9500 | −7.6142 |
| S13 | infinity | 0.3257 | 1.52, 64.2 | 3.0271 | |
| S14 | infinity | 0.7285 | | 3.1419 | |
| IMA(S15) | infinity | | | 3.5781 | |

TABLE 6

| No. of surface | A4 | A6 | A8 | A10 | A12 | A14 | A16 |
|---|---|---|---|---|---|---|---|
| S1 | 1.2636E−02 | −6.5981E−03 | 1.0693E−02 | −4.0026E−03 | 0 | 0 | 0 |
| S2 | 1.2670E−02 | 4.6950E−03 | −1.1752E−02 | 1.1410E−03 | 0 | 0 | 0 |
| S3 | −7.7121E−02 | 9.7487E−02 | −7.0065E−02 | 1.9981E−02 | 0 | 0 | 0 |
| S4 | −3.9451E−02 | 6.3160E−02 | −4.1037E−02 | 9.4658E−03 | 0 | 0 | 0 |
| S5 | −1.6660E−02 | −3.2249E−02 | −1.2175E−02 | 6.6441E−03 | 0 | 0 | 0 |
| S6 | −3.5718E−02 | 5.4354E−03 | −7.2104E−02 | 1.0457E−02 | 0 | 0 | 0 |
| S7 | −7.2268E−02 | 2.6000E−02 | 7.1103E−04 | −1.1308E−03 | 0 | 0 | 0 |
| S8 | −5.2356E−02 | −8.2270E−03 | 4.9264E−03 | −1.0934E−03 | 0 | 0 | 0 |
| S9 | −1.2695E−03 | 3.3404E−03 | −2.0815E−02 | 9.9535E−03 | −2.4841E−03 | 2.4971E−04 | 0.0000E+00 |
| S10 | −1.8648E−03 | 1.0831E−02 | −1.4748E−02 | 5.9386E−03 | −9.7233E−04 | 5.4105E−05 | 0.0000E+00 |
| S11 | −6.5174E−02 | −1.8620E−02 | 2.1668E−02 | −6.3028E−03 | 8.9667E−04 | −6.4898E−05 | 1.9154E−06 |
| S12 | −6.8124E−02 | 2.1942E−02 | −4.8086E−03 | 7.1459E−04 | −7.6129E−05 | 5.3142E−06 | −1.6605E−07 |

Furthermore, f1=3.37 mm, f2=−5.94 mm, f3=−116 mm, f4=16.72 mm, f5=2.25 mm, f6=−1.68 mm, f=4.74 mm, TTL=5.7 mm and Semi-FOV=36.75°, Fno=2.03.

Figures 14, 15:
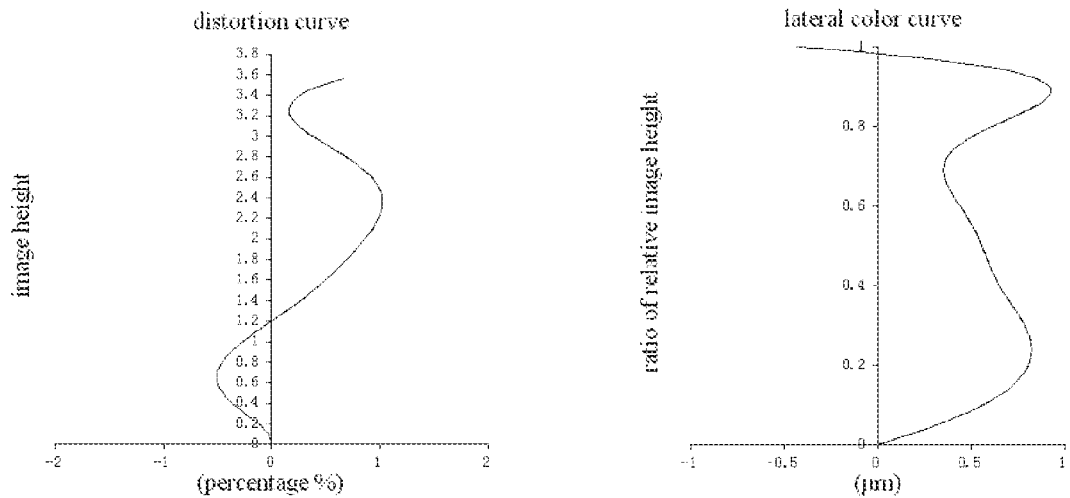
FIG. 14 is a diagram showing a distortion curve (%) of the camera lens in Example 3.
FIG. 15 is a diagram showing a lateral color curve (μm) of the camera lens in Example 3.
Figure 16:
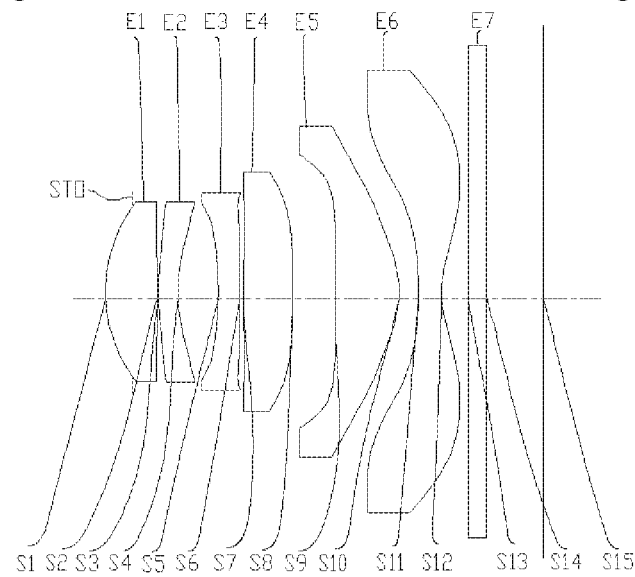
FIG. 16 is a schematic view showing the camera lens according to Example 4 of the present disclosure.

FIG. 12 is a diagram showing a longitudinal aberration curve (mm) of the camera lens in Example 3, FIG. 13 is a diagram showing an astigmatism curve (mm) of the camera lens in Example 3, FIG. 14 is a diagram showing a distortion curve (%) of the camera lens in Example 3, and FIG. 15 is a diagram showing a lateral color curve (μm) of the camera lens in Example 3. It can be seen that the aberration of the camera lens may be controlled effectively.

Embodiment 4

In example 4, the camera lens meets the conditions of the following tables:

TABLE 7

| No. of surface | Curvature radius | Thickness | Material | Effective aperture | Conic coefficient |
|---|---|---|---|---|---|
| OBJ | infinity | infinity | | | |
| STO | infinity | −0.3459 | | 1.1246 | |
| S1 | 1.9441 | 0.6659 | 1.54, 56.1 | 1.1497 | −0.3022 |
| S2 | −15.8942 | 0.0181 | | 1.1606 | −51.0863 |
| S3 | 4.5470 | 0.2511 | 1.64, 23.8 | 1.1662 | −1.6395 |
| S4 | 2.0878 | 0.5156 | | 1.1491 | −5.7163 |
| S5 | −6.6206 | 0.2808 | 1.64, 23.8 | 1.1502 | 13.4765 |
| S6 | 300.0215 | 0.0401 | | 1.2753 | −769.3265 |
| S7 | 7.0842 | 0.6422 | 1.54, 56.1 | 1.3363 | −4.7955 |
| S8 | −41.9061 | 0.5504 | | 1.5437 | −759.8294 |
| S9 | −159.2891 | 0.8236 | 1.54, 56.1 | 1.7705 | −694.3210 |
| S10 | −1.1632 | 0.2445 | | 2.1398 | −5.6378 |
| S11 | −5.6199 | 0.2974 | 1.54, 56.1 | 2.5851 | −61.7295 |
| S12 | 1.1792 | 0.3417 | | 2.8607 | −7.4725 |
| S13 | infinity | 0.2389 | 1.52, 64.2 | 3.1257 | |
| S14 | infinity | 0.7297 | | 3.1794 | |
| IMA(S15) | infinity | | | 3.4364 | |

TABLE 8

| No. of surface | A4 | A6 | A8 | A10 | A12 | A14 | A16 |
|---|---|---|---|---|---|---|---|
| S1 | 1.0304E−02 | −6.6874E−03 | 1.0553E−02 | −4.6245E−03 | 0 | 0 | 0 |
| S2 | 2.2269E−02 | 6.6329E−03 | −1.2166E−02 | 2.0779E−03 | 0 | 0 | 0 |
| S3 | −8.0458E−02 | 9.9609E−02 | −6.8894E−02 | 1.9503E−02 | 0 | 0 | 0 |

TABLE 8-continued

| No. of surface | A4 | A6 | A8 | A10 | A12 | A14 | A16 |
|---|---|---|---|---|---|---|---|
| S4 | −4.1923E−02 | 5.6827E−02 | −4.2257E−02 | 7.3493E−03 | 0 | 0 | 0 |
| S5 | −1.6649E−02 | −3.1362E−02 | −1.2189E−02 | 8.8359E−03 | 0 | 0 | 0 |
| S6 | −3.3194E−02 | 6.4154E−03 | −7.0592E−03 | 9.6829E−03 | 0 | 0 | 0 |
| S7 | −7.4594E−02 | 2.5018E−02 | 3.0101E−04 | −1.1201E−03 | 0 | 0 | 0 |
| S8 | −4.9974E−02 | −7.5916E−03 | 5.4694E−03 | −8.8007E−04 | 0 | 0 | 0 |
| S9 | 8.8177E−04 | 3.7185E−03 | −2.0631E−02 | 1.0050E−02 | −2.4783E−03 | 2.4124E−04 | 0.0000E+00 |
| S10 | −3.1393E−03 | 1.1174E−02 | −1.4699E−02 | 5.9504E−03 | −9.6940E−04 | 5.4798E−05 | 0.0000E+00 |
| S11 | −6.5675E−03 | −1.8653E−02 | 2.1669E−02 | −6.3021E−03 | 8.9678E−04 | −6.4884E−05 | 1.9150E−06 |
| S12 | −7.1030E−02 | 2.1827E−02 | −4.8144E−03 | 7.1411E−04 | −7.6184E−05 | 5.3078E−06 | −1.6676E−07 |

Furthermore, f1=3.22 mm, f2=−6.28 mm, f3=−10.11 mm, f4=11.15 mm, f5=2.14 mm, f6=−1.76 mm, f=4.57 mm, TTL=5.64 mm and Semi-FOV=36.51°, Fno=2.03.

Figures 17, 18:
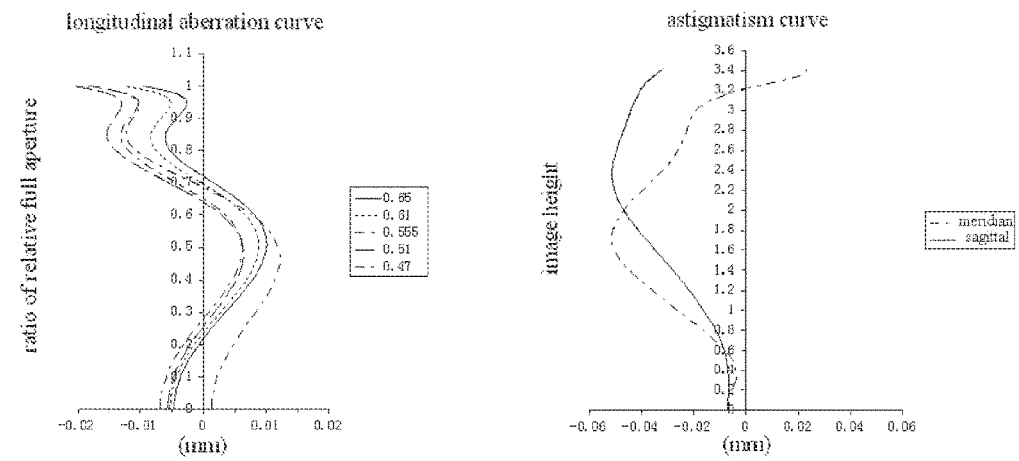
FIG. 17 is a diagram showing a longitudinal aberration curve (mm) of the camera lens in Example 4.
FIG. 18 is a diagram showing an astigmatism curve (mm) of the camera lens in Example 4.
Figures 19, 20:
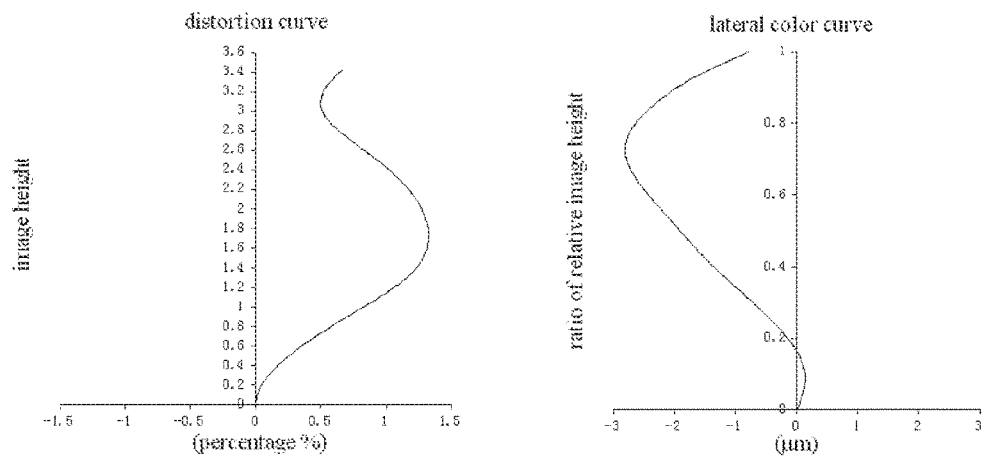
FIG. 19 is a diagram showing a distortion curve (%) of the camera lens in Example 4.
FIG. 20 is a diagram showing a lateral color curve (μm) of the camera lens in Example 4.
Figure 21:
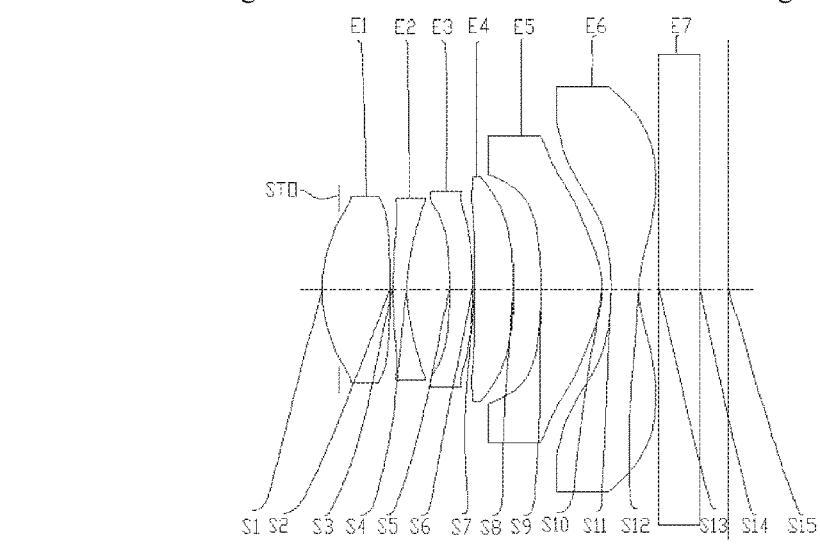
FIG. 21 is a schematic view showing the camera lens according to Example 5 of the present disclosure.

FIG. 17 is a diagram showing a longitudinal aberration curve (mm) of the camera lens in Example 4, FIG. 18 is a diagram showing an astigmatism curve (mm) of the camera lens in Example 4, FIG. 19 is a diagram showing a distortion curve (%) of the camera lens in Example 4, and FIG. 20 is a diagram showing a lateral color curve (μm) of the camera lens in Example 4. It can be seen that the aberration of the camera lens may be controlled effectively.

Embodiment 5

In example 5, the camera lens meets the conditions of the following tables:

TABLE 9

| No. of surface | Curvature radius | Thickness | Material | Effective aperture | Conic coefficient |
|---|---|---|---|---|---|
| OBJ | infinity | infinity | | | |
| STO | infinity | −0.2461 | | 1.1676 | |
| S1 | 2.0799 | 0.9836 | 1.54, 56.1 | 1.2867 | −0.4674 |
| S2 | −9.8868 | 0.0418 | | 1.3470 | 32.8598 |
| S3 | 5.3833 | 0.1989 | 1.64, 23.8 | 1.3096 | −5.6624 |
| S4 | 2.2726 | 0.6215 | | 1.2793 | −6.4538 |
| S5 | −5.9626 | 0.3240 | 1.64, 23.8 | 1.2858 | 3.9342 |
| S6 | −8.0123 | 0.0295 | | 1.4164 | −21.2967 |
| S7 | 16.9807 | 0.5575 | 1.54, 56.1 | 1.5776 | 12.8037 |
| S8 | −7.5769 | 0.3974 | | 1.6262 | −7.6853 |
| S9 | −6.4450 | 0.8829 | 1.54, 56.1 | 1.6548 | 11.3923 |
| S10 | −1.1596 | 0.1292 | | 2.2147 | −5.6550 |
| S11 | −4.1864 | 0.3974 | 1.54, 56.1 | 2.4386 | −12.7672 |
| S12 | 1.1728 | 0.2965 | | 2.9293 | −7.8496 |
| S13 | infinity | 0.5888 | 1.52, 64.2 | 3.2452 | |
| S14 | infinity | 0.4105 | | 3.4039 | |
| IMA(S15) | infinity | | | 3.6037 | |

Furthermore, f1=3.24 mm, f2=−6.3 mm, f3=−38.8 mm, f4=9.67 mm, f5=2.45 mm, f6=−1.64 mm, f=4.75 mm, TTL=5.86 mm and Semi-FOV=36.4°, Fno=2.03.

Figure 22:
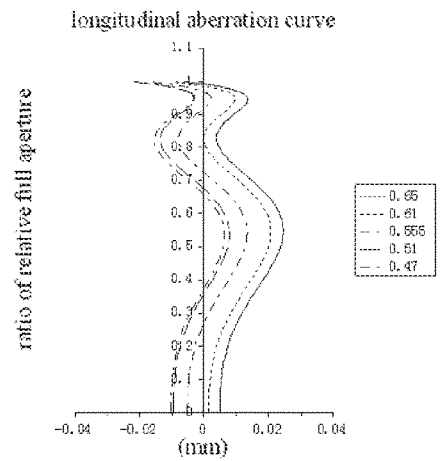
FIG. 22 is a diagram showing a longitudinal aberration curve (mm) of the camera lens in Example 5.
Figure 23:
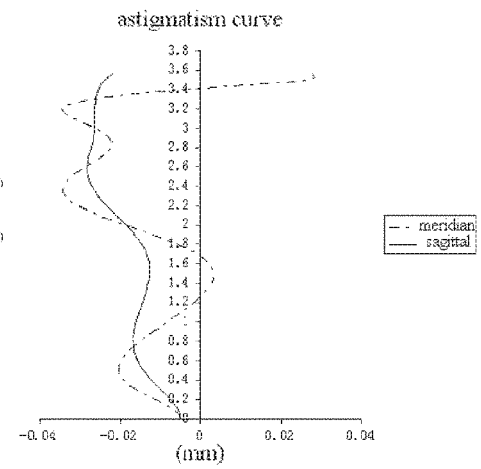
FIG. 23 is a diagram showing an astigmatism curve (mm) of the camera lens in Example 5.
Figure 24:
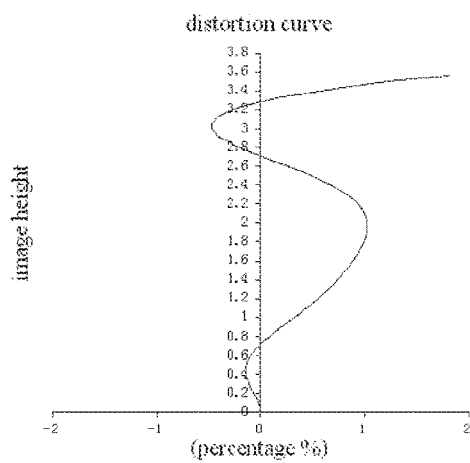
FIG. 24 is a diagram showing a distortion curve (%) of the camera lens in Example 5.
Figure 25:
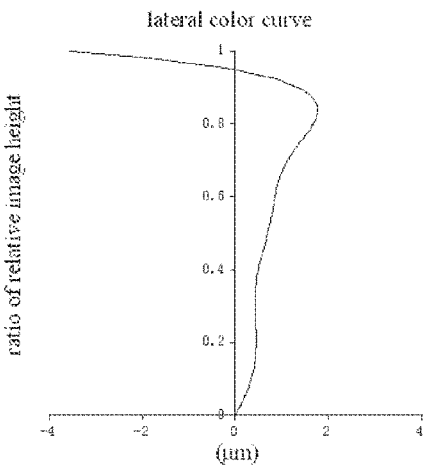
FIG. 25 is a diagram showing a lateral color curve (μm) of the camera lens in Example 5.

FIG. 22 is a diagram showing a longitudinal aberration curve (mm) of the camera lens in Example 5, FIG. 23 is a diagram showing an astigmatism curve (mm) of the camera lens in Example 5, FIG. 24 is a diagram showing a distortion curve (%) of the camera lens in Example 5, and FIG. 25 is a diagram showing a lateral color curve (μm) of the camera lens in Example 5. It can be seen that the aberration of the camera lens may be controlled effectively.

Embodiment 6

In example 6, the camera lens meets the conditions of the following tables:

TABLE 11

| No. of surface | Curvature radius | Thickness | Material | Effective aperture | Conic coefficient |
|---|---|---|---|---|---|
| OBJ | infinity | infinity | | | |
| STO | infinity | −0.3539 | | 0.9831 | |
| S1 | 1.4700 | 0.6303 | 1.54, 56.1 | 1.0131 | −0.2588 |
| S2 | −54.0206 | 0.0283 | | 0.9519 | −14.0669 |
| S3 | 10.8837 | 0.2100 | 1.64, 23.8 | 0.8961 | −37.5585 |
| S4 | 2.3852 | 0.3734 | | 0.9157 | −1.4436 |
| S5 | −7.8357 | 0.2297 | 1.64, 23.8 | 0.9678 | −311.8102 |
| S6 | −16.1027 | 0.0305 | | 1.0789 | −126.3860 |
| S7 | 5.5386 | 0.3481 | 1.54, 56.1 | 1.1978 | −104.1177 |
| S8 | 8.9498 | 0.4379 | | 1.3938 | −53.3858 |
| S9 | 274.0655 | 0.6503 | 1.54, 56.1 | 1.5167 | −0.9885 |
| S10 | −1.1061 | 0.2223 | | 1.7491 | −5.6788 |
| S11 | −3.1188 | 0.3409 | 1.54, 56.1 | 2.2381 | −35.1393 |
| S12 | 1.2775 | 0.2941 | | 2.4800 | −8.4336 |
| S13 | infinity | 0.1100 | 1.52, 64.2 | 2.8391 | |
| S14 | infinity | 0.5757 | | 2.8703 | |
| IMA(S15) | infinity | | | 3.1111 | |

TABLE 10

| No. of surface | A4 | A6 | A8 | A10 | A12 | A14 | A16 |
|---|---|---|---|---|---|---|---|
| S1 | 6.9184E−03 | −8.6675E−03 | 1.0493E−02 | −5.7318E−03 | 0 | 0 | 0 |
| S2 | 1.7321E−02 | 1.0685E−03 | −1.5973E−02 | 2.4497E−02 | 0 | 0 | 0 |
| S3 | −8.4517E−02 | 9.7484E−02 | −6.9952E−02 | 1.7201E−02 | 0 | 0 | 0 |
| S4 | −3.8404E−02 | 6.3771E−02 | −3.8623E−02 | 7.9088E−03 | 0 | 0 | 0 |
| S5 | −8.2746E−03 | −2.7539E−02 | −1.1427E−02 | 8.0280E−03 | 0 | 0 | 0 |
| S6 | −3.5717E−02 | 3.5413E−03 | −1.0700E−02 | 7.3613E−03 | 0 | 0 | 0 |
| S7 | −7.1126E−02 | 2.5434E−02 | 8.2367E−04 | −8.7531E−04 | 0 | 0 | 0 |
| S8 | −4.8948E−02 | −5.1372E−03 | 5.2131E−03 | −9.9362E−04 | 0 | 0 | 0 |
| S9 | −5.9850E−03 | 5.4131E−03 | −2.0910E−02 | 9.7105E−03 | −2.5913E−03 | 2.1951E−04 | 0.0000E+00 |
| S10 | −6.4637E−03 | 1.0836E−02 | −1.4596E−02 | 5.9678E−03 | −9.6707E−04 | 5.5070E−05 | 0.0000E+00 |
| S11 | −6.1515E−02 | −1.8606E−02 | 2.1648E−02 | −6.3054E−03 | 8.9637E−04 | −6.4927E−05 | 1.9119E−06 |
| S12 | −6.6116E−02 | 2.1783E−02 | −4.8440E−03 | 7.1147E−04 | −7.6291E−05 | 5.3109E−06 | −1.6567E−07 |

TABLE 12

| No. of surface | A4 | A6 | A8 | A10 | A12 | A14 | A16 |
|---|---|---|---|---|---|---|---|
| S1 | 3.5668E−03 | 1.0998E−01 | −4.9243E−01 | 1.3637E+00 | −2.0703E+00 | 1.6113E+00 | −5.0690E−01 |
| S2 | −2.8182E−02 | 2.3918E−01 | −6.0754E−01 | 9.3996E−01 | −9.8519E−01 | 6.6965E−01 | −2.4249E−01 |
| S3 | −9.6141E−02 | 3.4603E−01 | −7.1776E−01 | 1.0228E+00 | −8.7007E−01 | 4.7641E−01 | −1.7087E−01 |
| S4 | −4.9011E−02 | 1.4009E−01 | −1.8806E−01 | 3.7174E−01 | −3.7229E−01 | 3.3317E−01 | −1.1746E−01 |
| S5 | −8.3507E−02 | −5.8127E−02 | −7.0330E−02 | 3.7224E−02 | 2.4310E−01 | −1.8673E−01 | 5.9726E−02 |
| S6 | −9.5175E−02 | 2.0331E−01 | −5.4876E−01 | 5.8262E−01 | 2.0944E−02 | −3.6130E−01 | 1.6283E−01 |
| S7 | −2.0318E−01 | 4.1405E−01 | −7.4568E−01 | 9.7496E−01 | −7.1742E−01 | 2.6199E−01 | −3.8078E−02 |
| S8 | −1.6987E−01 | 9.1722E−02 | −2.2171E−02 | −1.5504E−02 | 3.0749E−02 | −1.3662E−02 | 1.3615E−03 |
| S9 | −5.9420E−03 | −6.1710E−02 | 1.4203E−03 | 1.3246E−02 | −9.9239E−04 | −3.7940E−03 | 1.0870E−03 |
| S10 | −3.9040E−02 | 1.1070E−02 | −6.5342E−02 | 6.4698E−02 | −2.3104E−02 | 3.0555E−03 | −7.9382E−05 |
| S11 | −1.6863E−01 | −2.8478E−02 | 8.8142E−02 | −4.0130E−02 | 8.4712E−03 | −8.8209E−04 | 3.6581E−05 |
| S12 | −1.3251E−01 | 6.9331E−02 | −2.6586E−02 | 6.7626E−03 | −1.1236E−03 | 1.0824E−04 | −4.4065E−06 |

Furthermore, f1=2.63 mm, f2=−4.82 mm, f3=−24.1 mm, f4=25.7 mm, f5=2.02 mm, f6=−1.64 mm, f=3.74 mm, TTL=4.48 mm and Semi-FOV=39.1°, Fno=1.9.

FIG. 27 is a diagram showing a longitudinal aberration curve (mm) of the camera lens in Example 6, FIG. 28 is a diagram showing an astigmatism curve (mm) of the camera lens in Example 6, FIG. 29 is a diagram showing a distortion curve (%) of the camera lens in Example 6, and FIG. 30 is a diagram showing a lateral color curve (μm) of the camera lens in Example 6. It can be seen that the aberration of the camera lens may be controlled effectively.

Embodiment 7

In example 7, the camera lens meets the conditions of the following tables:

TABLE 13

| No. of surface | Curvature radius | Thickness | Material | Effective aperture | Conic coefficient |
|---|---|---|---|---|---|
| OBJ | infinity | infinity | | | |
| STO | infinity | −0.3335 | | 0.9069 | |
| S1 | 1.3902 | 0.5463 | 1.54, 56.1 | 0.9069 | −0.1506 |
| S2 | 28.7213 | 0.0250 | | 0.8510 | 98.2324 |
| S3 | 10.0564 | 0.2000 | 1.64, 23.8 | 0.8536 | 67.5039 |
| S4 | 2.5679 | 0.3750 | | 0.8311 | 0.8469 |
| S5 | −7.7963 | 0.2000 | 1.64, 23.8 | 0.8581 | −10.0000 |
| S6 | −21.6677 | 0.0274 | | 0.9960 | −10.0000 |
| S7 | 26.3077 | 0.4233 | 1.54, 56.1 | 1.0956 | −57.3279 |
| S8 | −30.3258 | 0.3765 | | 1.2400 | −10.0000 |
| S9 | 14.3940 | 0.4956 | 1.54, 56.1 | 1.3792 | −53.7508 |
| S10 | −1.4357 | 0.3661 | | 1.6508 | −8.7940 |
| S11 | −4.6085 | 0.2569 | 1.54, 56.1 | 2.3550 | −12.4405 |
| S12 | 1.3631 | 0.3118 | | 2.2713 | −9.4692 |
| S13 | infinity | 0.2100 | 1.52, 64.2 | 3.1181 | |
| S14 | infinity | 0.4659 | | 3.1181 | |
| IMA(S15) | infinity | | | 2.9424 | |

TABLE 14

| No. of surface | A4 | A6 | A8 | A10 | A12 | A14 | A16 |
|---|---|---|---|---|---|---|---|
| S1 | −4.8590E−05 | 1.9440E−01 | −1.0343E+00 | 3.0308E+00 | −4.8116E+00 | 3.9221E+00 | −1.3126E+00 |
| S2 | −5.0836E−03 | 1.1973E−02 | 6.4602E−02 | −3.5528E−01 | 7.5302E−01 | −8.0567E−01 | 3.0291E−01 |
| S3 | −2.5050E−02 | 1.0243E−02 | 2.8510E−01 | −9.9191E−01 | 1.9638E+00 | −1.9813E+00 | 7.9431E−01 |
| S4 | 1.8436E−02 | −5.7749E−02 | 6.0191E−01 | −1.7235E+00 | 3.2484E+00 | −3.2964E+00 | 1.5217E+00 |
| S5 | −5.8974E−02 | −1.1037E−02 | −1.2725E+00 | 3.9943E+00 | −6.3607E+00 | 5.1327E+00 | −1.5874E+00 |
| S6 | −8.3687E−02 | 1.0178E−01 | −4.0390E−01 | 3.2187E−01 | 4.8008E−01 | −8.6126E−01 | 3.7970E−01 |
| S7 | −2.2682E−01 | 4.1915E−01 | −7.4290E−01 | 1.1188E+00 | −1.0068E+00 | 4.7460E−01 | −9.0274E−02 |
| S8 | −1.7579E−01 | −2.5747E−02 | 1.5407E−01 | −1.6083E−01 | 8.0524E−02 | −5.8945E−03 | −3.8682E−03 |
| S9 | 3.1891E−02 | −1.7161E−01 | 1.2637E−01 | −9.8441E−02 | 6.6041E−02 | −2.8276E−02 | 4.9934E−03 |
| S10 | −4.7064E−02 | 7.3087E−02 | −1.7749E−01 | 1.6692E−01 | −7.2307E−02 | 1.5093E−02 | −1.2509E−03 |
| S11 | −2.8761E−01 | 1.1133E−01 | 1.7878E−02 | −2.0365E−02 | 5.2434E−03 | −5.9703E−04 | 2.6083E−05 |
| S12 | −2.0044E−01 | 1.3605E−01 | −6.2136E−02 | 1.8311E−02 | −3.4177E−03 | 3.6133E−04 | −1.6070E−05 |

Furthermore, f1=2.66 mm, f2=−5.44 mm, f3=−19.1 mm, f4=25.9 mm, f5=2.42 mm, f6=−1.9 mm, f=3.58 mm, TTL=4.28 mm and Semi-FOV=39°, Fno=1.98.

Figures 32, 33:
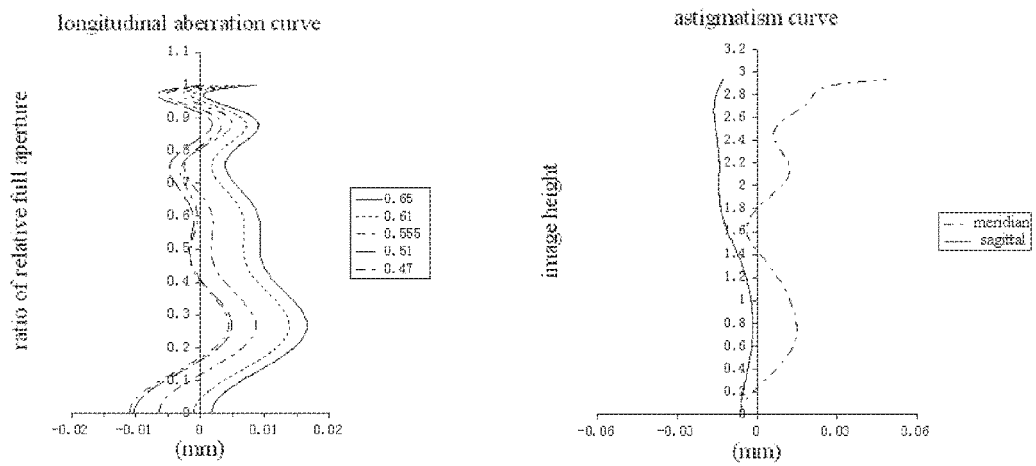
FIG. 32 is a diagram showing a longitudinal aberration curve (mm) of the camera lens in Example 7.
FIG. 33 is a diagram showing an astigmatism curve (mm) of the camera lens in Example 7.
Figures 34, 35:
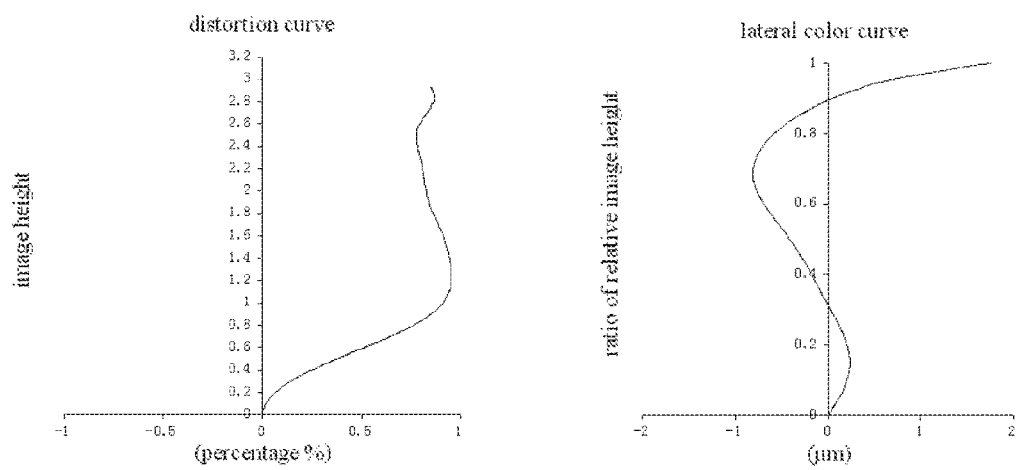
FIG. 34 is a diagram showing a distortion curve (%) of the camera lens in Example 7.
FIG. 35 is a diagram showing a lateral color curve (μm) of the camera lens in Example 7.
Figure 36:
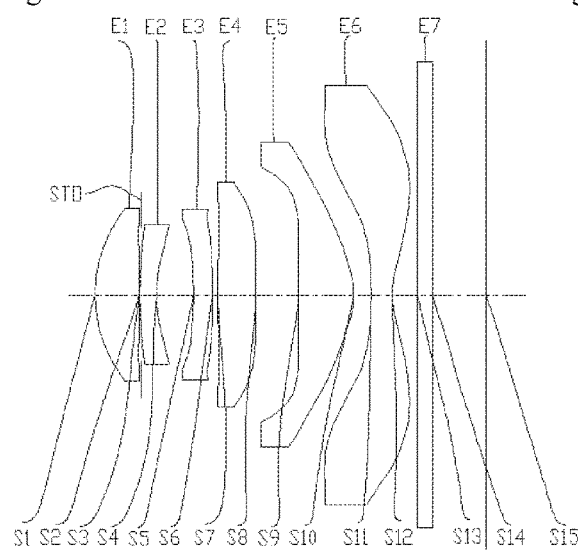
FIG. 36 is a schematic view showing the camera lens according to Example 8 of the present disclosure.

FIG. 32 is a diagram showing a longitudinal aberration curve (mm) of the camera lens in Example 7, FIG. 33 is a diagram showing an astigmatism curve (mm) of the camera lens in Example 7, FIG. 34 is a diagram showing a distortion curve (%) of the camera lens in Example 7, and FIG. 35 is a diagram showing a lateral color curve (μm) of the camera lens in Example 7. It can be seen that the aberration of the camera lens may be controlled effectively.

Embodiment 8

In example 8, the camera lens meets the conditions of the following tables:

TABLE 15

| No. of surface | Curvature radius | Thickness | Material | Effective aperture | Conic coefficient |
|---|---|---|---|---|---|
| OBJ | infinity | infinity | | | |
| S1 | 1.9608 | 0.6234 | 1.54, 56.1 | 1.2179 | −0.2898 |
| S2 | −17.3412 | 0.0368 | | 1.1000 | −113.3017 |
| STO | infinity | −0.0296 | | 0.9540 | |
| S3 | 4.6333 | 0.2423 | 1.64, 23.8 | 0.9524 | −2.1318 |
| S4 | 2.0433 | 0.5180 | | 0.9815 | −5.5127 |
| S5 | −6.2547 | 0.2633 | 1.64, 23.8 | 1.0495 | 11.9483 |
| S6 | −11.3413 | 0.0716 | | 1.2010 | −79.2005 |
| S7 | 8.0388 | 0.5458 | 1.54, 56.1 | 1.5800 | 2.0265 |
| S8 | 65.9238 | 0.5943 | | 1.5654 | 92.4656 |
| S9 | −255.1439 | 0.7678 | 1.54, 56.1 | 1.7904 | −501.0938 |
| S10 | −1.1573 | 0.2544 | | 2.1397 | −5.3948 |
| S11 | −5.8654 | 0.2938 | 1.54, 56.1 | 2.6690 | −49.2913 |
| S12 | 1.1701 | 0.3558 | | 2.9500 | −7.3293 |
| S13 | infinity | 0.2120 | 1.52, 64.2 | 3.2219 | |
| S14 | infinity | 0.7596 | | 3.2747 | |
| IMA(S15) | infinity | | | 3.5735 | |

TABLE 16

| No. of surface | A4 | A6 | A8 | A10 | A12 | A14 | A16 |
|---|---|---|---|---|---|---|---|
| S1 | 1.0612E−02 | −6.5657E−03 | 1.0632E−02 | −4.7954E−03 | 0.0000E+00 | 0.0000E+00 | 0.0000E+00 |
| S2 | 2.3340E−02 | 7.1371E−03 | −1.1644E−02 | 2.7413E−03 | 0.0000E+00 | 0.0000E+00 | 0.0000E+00 |
| S3 | −8.0991E−02 | 1.0023E−01 | −6.7753E−02 | 2.0943E−02 | 0.0000E+00 | 0.0000E+00 | 0.0000E+00 |
| S4 | −4.0889E−02 | 5.7414E−02 | −4.1826E−02 | 7.7110E−03 | 0.0000E+00 | 0.0000E+00 | 0.0000E+00 |
| S5 | −1.5234E−02 | −3.0132E−02 | −1.1400E−02 | 9.0861E−03 | 0.0000E+00 | 0.0000E+00 | 0.0000E+00 |
| S6 | −3.2529E−02 | 7.1065E−03 | −6.3615E−03 | 1.0396E−03 | 0.0000E+00 | 0.0000E+00 | 0.0000E+00 |
| S7 | −7.2652E−02 | 2.5679E−02 | 4.1302E−04 | −1.2469E−03 | 0.0000E+00 | 0.0000E+00 | 0.0000E+00 |
| S8 | −5.2445E−02 | −8.0741E−03 | 5.3160E−03 | −9.3455E−04 | 0.0000E+00 | 0.0000E+00 | 0.0000E+00 |
| S9 | 1.7719E−03 | 4.1500E−03 | −2.0613E−02 | 1.0019E−02 | −2.4942E−03 | 2.3586E−04 | 0.0000E+00 |
| S10 | −3.3392E−03 | 1.1029E−02 | −1.4719E−02 | 5.9485E−03 | −9.6934E−04 | 5.4903E−05 | 0.0000E+00 |
| S11 | −6.5630E−02 | −1.8627E−02 | 2.1672E−02 | −6.3018E−03 | 8.9681E−04 | −6.4883E−05 | 1.9146E−06 |
| S12 | −6.9979E−02 | 2.1849E−02 | −4.8139E−03 | 7.1418E−04 | −7.6173E−05 | 5.3093E−06 | −1.6657E−07 |

Furthermore, f1=3.26 mm, f2=−5.93 mm, f3=−22.23 mm, f4=16.72 mm, f5=2.13 mm, f6=1.76 mm, f=4.43 mm, TTL=5.51 mm and Semi-FOV=39°, Fno=2.03.

Figure 37:
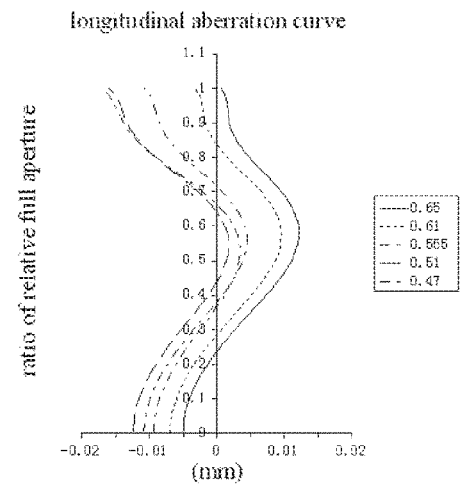
FIG. 37 is a diagram showing a longitudinal aberration curve (mm) of the camera lens in Example 8.
Figure 38:
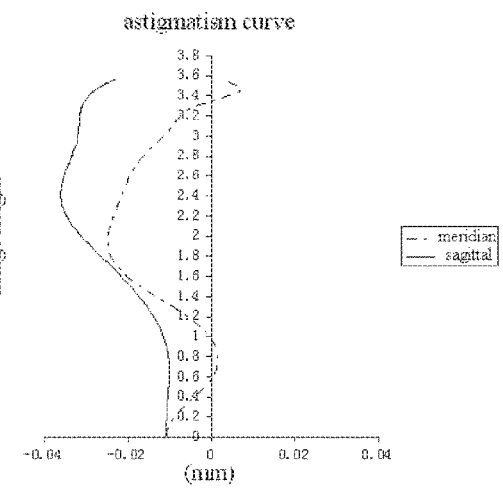
FIG. 38 is a diagram showing an astigmatism curve (mm) of the camera lens in Example 8.
Figure 39:
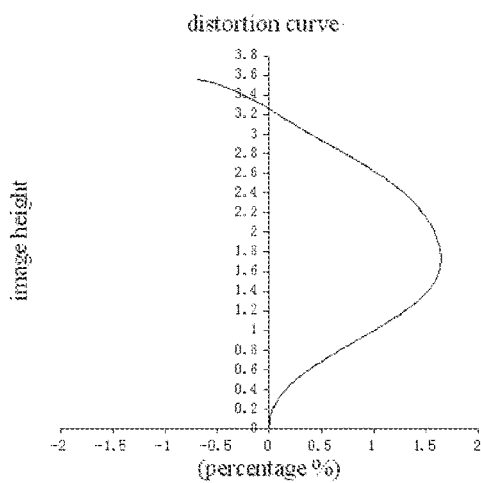
FIG. 39 is a diagram showing a distortion curve (%) of the camera lens in Example 8.
Figure 40:
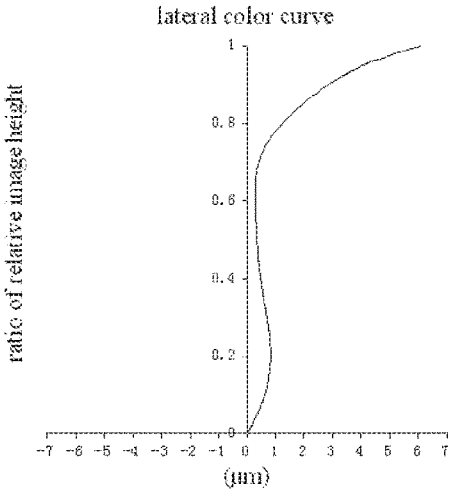
FIG. 40 is a diagram showing a lateral color curve (μm) of the camera lens in Example 8.

FIG. 37 is a diagram showing a longitudinal aberration curve (mm) of the camera lens in Example 8, FIG. 38 is a diagram showing an astigmatism curve (mm) of the camera lens in Example 8, FIG. 39 is a diagram showing a distortion curve (%) of the camera lens in Example 8, and FIG. 40 is a diagram showing a lateral color curve (μm) of the camera lens in Example 8. It can be seen that the aberration of the camera lens may be controlled effectively.

In examples 1 to 8, formulas meets the conditions of the following tables:

| | Embodiment | | | | | | | |
|---|---|---|---|---|---|---|---|---|
| | 1 | 2 | 3 | 4 | 5 | 6 | 7 | 8 |
| f/f4 | 0.26 | 0.35 | 0.28 | 0.41 | 0.49 | 0.145 | 0.14 | 0.26 |
| f123/Dr1r6 | 4.43 | 5.1 | 3.62 | 4.97 | 2.73 | 3.6 | 3.84 | 4.43 |
| T12/T23 | 0.063 | 0.066 | 0.118 | 0.035 | 0.067 | 0.08 | 0.07 | 0.07 |
| f123/f | 1.65 | 1.76 | 1.38 | 1.88 | 1.25 | 1.42 | 1.44 | 1.65 |
| f5/f | 0.47 | 0.47 | 0.48 | 0.47 | 0.52 | 0.54 | 0.67 | 0.48 |
| (R11 + R12)/(R11 − R12) | 0.66 | 0.71 | 0.66 | 0.65 | 0.56 | 0.42 | 0.54 | 0.67 |

Reference throughout this specification to terms "an embodiment", "some embodiments", "exemplary embodiment", "an example", "a specific example" or "some examples" means that a particular feature, structure, refractive index/abbe number, or characteristic described in connection with the embodiment or example is included in at least one embodiment or example of the present disclosure. Thus, the exemplary expressions of terms described above are not necessarily referring to the same embodiment or example of the present disclosure. Furthermore, the particular features, structures, materials, or characteristics may be combined in any suitable manner in one or more embodiments or examples.

Although explanatory embodiments of the present invention have been shown and described, it would be appreciated by those ordinary skilled in the art that various changes, modifications, alternatives and variants can be made in these embodiments without departing from principles and spirits of the present invention, and the scope of the present invention is restricted by claims and their equivalents.

What is claimed is:

1. A camera lens, comprising: a first lens, a second lens, a third lens, a fourth lens, a fifth lens and a sixth lens from an object side of the camera lens to an image side of the camera lens in turn, wherein
the first lens is of a positive focal power, an object side surface of the first lens is convex;
the second lens is of a negative focal power;
the third lens is of a negative focal power, an object side surface of the third lens is concave;
the fourth lens is of a positive focal power;
the fifth lens is of a positive focal power, an image side surface of the fifth lens is convex;
the sixth lens is of a negative focal power, an image side surface of the sixth lens is concave; and
the camera lens meets the following formula:

$0 < f/f4 < 0.8;$ $0 < T12/T23 < 0.14,$ wherein f represents an effective focal length of the camera lens, f4 represents a focal length of the fourth lens, T12 is a distance between the first lens and the second lens along an axial direction, and T23 is a distance between the second lens and the third lens along the axial direction, wherein an image side surface of the third lens is convex;

an object side surface of the fourth lens is convex.

2. The camera lens according to claim 1, wherein an object side surface of the second lens is convex, and an image side surface of the second lens is concave.

3. The camera lens according to claim 2, wherein the camera lens meets the following formula:

$$1 < f123/Dr1r6 < 5.5,$$

wherein f123 represents a combined focal length of the first lens, the second lens and the third lens, and Dr1r6 represents a distance from the object side surface of the first lens to an image side surface of the third lens along the axial direction.

4. The camera lens according to claim 2, wherein the camera lens further meets the following formula:

$$0.5 < f123/f < 2,$$

wherein f123 represents the combined focal length of the first lens, the second lens and the third lens.

5. The camera lens according to claim 2, wherein the camera lens further meets the following formula:

$$0 < f5/f < 1; \text{ and}$$

$$0 < (R11+R12)/(R11-R12) < 1,$$

wherein f5 represents a focal length of the fifth lens, and

R11 and R12 represent curvature radiuses of the object side surface and the image side surface of the sixth lens, respectively.

6. The camera lens according to claim 1, wherein an object side surface of the sixth lens is concave;

at least one inflection point is present in the object side surface of the sixth lens and the image side surface of the sixth lens; and the camera lens further comprises an aperture stop arranged between a photographed object and the second lens.

7. The camera lens according to claim 6, wherein the camera lens meets the following formula:

$$1 < f123/Dr1r6 < 5.5,$$

wherein f123 represents a combined focal length of the first lens, the second lens and the third lens, and Dr1r6 represents a distance from the object side surface of the first lens to an image side surface of the third lens along the axial direction.

8. The camera lens according to claim 6, wherein the camera lens further meets the following formula:

$$0.5 < f123/f < 2,$$

wherein f123 represents the combined focal length of the first lens, the second lens and the third lens.

9. The camera lens according to claim 6, wherein the camera lens further meets the following formula:

$$0 < f5/f < 1; \text{ and}$$

$$0 < (R11+R12)/(R11-R12) < 1,$$

wherein f5 represents a focal length of the fifth lens, and

R11 and R12 represent curvature radiuses of the object side surface and the image side surface of the sixth lens, respectively.

10. The camera lens according to claim 6, wherein the first lens, the second lens, the third lens, the fourth lens, the fifth lens and the sixth lens are all made of plastic, and have at least one aspheric shape surface.

11. The camera lens according to claim 6, wherein an image side surface of the first lens is convex, and an object side surface of the fifth lens is convex.

12. The camera lens according to claim 6, wherein an image side surface of the fourth lens is concave.

13. The camera lens according to claim 1, wherein the camera lens meets the following formula:

$$1 < f123/Dr1r6 < 5.5,$$

wherein f123 represents a combined focal length of the first lens, the second lens and the third lens, and Dr1r6 represents a distance from the object side surface of the first lens to the image side surface of the third lens along the axial direction.

14. The camera lens according to claim 1, wherein the camera lens further meets the following formula:

$$0.5 < f123/f < 2,$$

wherein f123 represents the combined focal length of the first lens, the second lens and the third lens.

15. The camera lens according to claim 1, wherein the camera lens further meets the following formula:

$$0 < f5/f < 1; \text{ and}$$

$$0 < (R11+R12)/(R11-R12) < 1,$$

wherein f5 represents a focal length of the fifth lens, and

R11 and R12 represent curvature radiuses of the object side surface and the image side surface of the sixth lens, respectively.

16. The camera lens according to claim 1, wherein the first lens, the second lens, the third lens, the fourth lens, the fifth lens and the sixth lens are all made of plastic, and have at least one aspheric shape surface.

17. The camera lens according to claim 1, wherein an image side surface of the first lens is convex, and an object side surface of the fifth lens is convex.

18. The camera lens according to claim 1, wherein an image side surface of the fourth lens is concave.

19. A camera lens, comprising: a first lens, a second lens, a third lens, a fourth lens, a fifth lens and a sixth lens from an object side of the camera lens to an image side of the camera lens in turn, wherein the first lens is of a positive focal power, an object side surface of the first lens is convex;

the second lens is of a negative focal power;

the third lens is of a negative focal power, an object side surface of the third lens is concave;

the fourth lens is of a positive focal power;

the fifth lens is of a positive focal power, an image side surface of the fifth lens is convex;

the sixth lens is of a negative focal power, an image side surface of the sixth lens is concave; and the camera lens meets the following formula:

$$0 < f/f4 < 0.8;$$

$$0 < T12/T23 < 0.14,$$

wherein f represents an effective focal length of the camera lens, f4 represents a focal length of the fourth lens, T12 is a distance between the first lens and the second lens along an axial direction, and T23 is a distance between the second lens and the third lens along the axial direction, wherein an image side surface of the third lens is convex;

an object side surface of the fifth lens is convex.

20. A camera lens, comprising: a first lens, a second lens, a third lens, a fourth lens, a fifth lens and a sixth lens from an object side of the camera lens to an image side of the camera lens in turn, wherein the first lens is of a positive focal power, an object side surface of the first lens is convex;

the second lens is of a negative focal power;

the third lens is of a negative focal power, an object side surface of the third lens is concave;

the fourth lens is of a positive focal power;

the fifth lens is of a positive focal power, an image side surface of the fifth lens is convex;

the sixth lens is of a negative focal power, an image side surface of the sixth lens is concave; and the camera lens meets the following formula:

$$0 < f/f4 < 0.8;$$

$$0 < T12/T23 < 0.14,$$

wherein f represents an effective focal length of the camera lens, f4 represents a focal length of the fourth lens, T12 is a distance between the first lens and the second lens along an axial direction, and T23 is a distance between the second lens and the third lens along the axial direction, wherein an image side surface of the third lens is convex;

an image side surface of the fourth lens is concave.

* * * * *